US009025220B2

(12) United States Patent
Nuttall et al.

(10) Patent No.: US 9,025,220 B2
(45) Date of Patent: May 5, 2015

(54) MOBILE OPTICAL SCANNING SYSTEM

(75) Inventors: Gordon R. Nuttall, Fort Collins, CO (US); Eugene A. Miksch, Loveland, CO (US)

(73) Assignee: Teco Image Systems Co., Ltd., Taipei (TW)

( * ) Notice: Subject to any disclaimer, the term of this patent is extended or adjusted under 35 U.S.C. 154(b) by 1119 days.

(21) Appl. No.: 12/925,802

(22) Filed: Oct. 29, 2010

(65) Prior Publication Data

US 2011/0102861 A1    May 5, 2011

Related U.S. Application Data

(60) Provisional application No. 61/403,126, filed on Sep. 10, 2010, provisional application No. 61/396,611, filed on May 28, 2010, provisional application No. 61/257,070, filed on Nov. 2, 2009, provisional application No. 61/257,021, filed on Nov. 1, 2009.

(51) Int. Cl.
| | |
|---|---|
| *H04N 1/04* | (2006.01) |
| *H04N 1/10* | (2006.01) |
| *H04N 1/00* | (2006.01) |
| *H04N 1/193* | (2006.01) |

(52) U.S. Cl.
CPC ......... *H04N 1/1017* (2013.01); *Y10T 29/49002* (2015.01); *H04N 1/00496* (2013.01); *H04N 1/00525* (2013.01); *H04N 1/0083* (2013.01); *H04N 1/193* (2013.01); *H04N 2201/0096* (2013.01); *H04N 2201/043* (2013.01)

(58) Field of Classification Search
None
See application file for complete search history.

(56) References Cited

U.S. PATENT DOCUMENTS

| | | | |
|---|---|---|---|
| 6,101,004 A | 8/2000 | Sung | |
| 6,552,272 B1 | 4/2003 | Sheng | |
| 6,587,231 B1 | 7/2003 | Sung | |
| 2002/0148900 A1 | 10/2002 | Gurevich et al. | |
| 2002/0154215 A1 | 10/2002 | Schechterman et al. | |
| 2003/0147105 A1 | 8/2003 | Yamauchi | |
| 2004/0066540 A1* | 4/2004 | Chang | 358/474 |
| 2005/0093713 A1 | 5/2005 | Orme | |

OTHER PUBLICATIONS

U.S. Appl. No. 61/257,021, filed Nov. 1, 2009.
U.S. Appl. No. 61/257,070, filed Nov. 2, 2009.
U.S. Appl. No. 61/396,611, filed May 28, 2010.
U.S. Appl. No. 61/403,126, filed Sep. 10, 2010.
Corresponding EP Patent Application No. 10827277.4; OA dated Oct. 29, 2014, 9 total pages.

* cited by examiner

*Primary Examiner* — Benny Q Tieu
*Assistant Examiner* — Michael Y Tzeng
(74) *Attorney, Agent, or Firm* — Kirton McConkie; Evan R. Witt

(57) ABSTRACT

A self-contained mobile optical scanning system having an image scanner contained within a hollow inside space defined by mated engagement of an upper housing and a lower housing having corresponding upper and lower transparent windows having reduced margins and a scanning control interface rotatable through the enclosed space which allows scanning through the upper transparent window in either the upright or inverted condition by alignment of viewable indicator marks and overlap indicators in relation to an article which allows stitched alignment of a plurality of scanning cycles to generate images embeddable with metadata or data files.

20 Claims, 10 Drawing Sheets

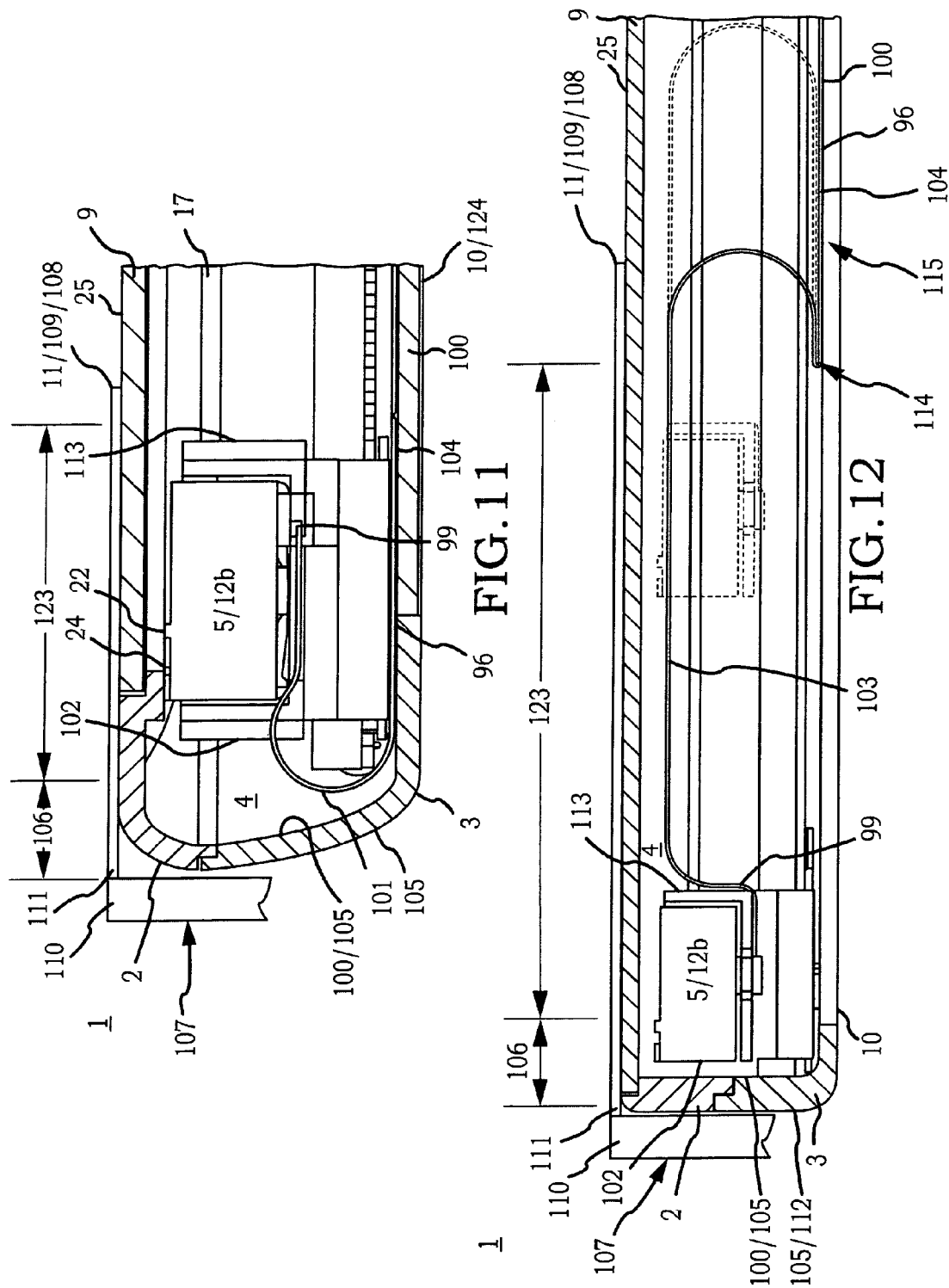

MOBILE OPTICAL SCANNING SYSTEM

This United States Non-Provisional Patent Application claims the benefit of U.S. Provisional Patent Application No. 61/403,126, filed Sep. 10, 2010, and U.S. Provisional Patent Application No. 61/396,611, filed May 28, 2010, and U.S. Provisional Patent Application No. 61/257,070, filed Nov. 2, 2009, and U.S. Provisional Patent Application No. 61/257,021, filed Nov. 1, 2009, each hereby incorporated by reference herein.

I. TECHNICAL FIELD

A self-contained mobile optical scanning system having an image scanner contained within a hollow inside space defined by mated engagement of an upper housing and a lower housing having corresponding upper and lower transparent windows having reduced margins and a scanning control interface rotatable through the enclosed space which allows scanning through the upper transparent window in either the upright or inverted condition by alignment of viewable indicator marks and overlap indicators in relation to an article which allows stitched alignment of a plurality of scanning cycles to generate images embeddable with metadata or data files.

II. BACKGROUND

Conventional scanner technology such as described in U.S. Pat. No. 6,587,231, hereby incorporated by reference in the entirety herein, has not had wide spread acceptance owing to various unresolved problems.

A first substantial problem with conventional scanners relates to reduction of the distance between the scanned area of the scanner bed and the side wall of the scanner. In part, this problem involves the external configuration of the scanner but to a greater degree involves the internal configuration of the image scanner and the configuration of the conductors for power and signal transmission coupled to the image sensor which prior to the instant invention precluded travel of the image sensor within the scanner to a location proximate or adjacent the internal surfaces of the scanner housing.

Another substantial problem with conventional scanners may be the lack of indicators viewable by the user to positionally fix the scanners between a plurality of scanning cycles such that the images corresponding to the plurality of scanning cycles can be joined or stitched into one image.

Another substantial problem with conventional scanners may be the lack of an application program to embed metadata in the generated images to provide contextual data related to the image, such as audio files, video files, date and time stamps, distribution information or the like.

Another substantial problem with convention scanners having a scanned transparent window and a viewing transparent window can be stray light reflected or otherwise transmitted from the viewing window which impairs the quality of the generated image.

Another substantial problem with conventional scanners having a scanned transparent window and a viewing transparent window can be that while the scanner can be operated in the upward facing condition or in the downward facing condition the scanner controls are fixed on one side of the scanner and may not be accessible on both sides of the scanner.

III. SUMMARY OF THE INVENTION

Accordingly, a significant object of the invention can be to provide a self-contained portable image scanning system which can be operated independent of any external computer.

Another significant object of the invention can be to provide a portable image scanner having a application program including a data embedding module which can function to embed metadata into a scanned image which can be used to describe the definition, structure, and administration of the image with all contents in context to facilitate subsequent use of the image.

Another significant object of the invention can be to provide a portable image scanner having a scanner contained within an enclosed space defined by mated engagement of an upper housing and a lower housing correspondingly providing an upper transparent window and a lower transparent window which allows positioning of the upper transparent window upon an upward facing document while viewing the article through the lower transparent window and the lower transparent window providing indicator marks which provide an indication of the scanned area and overlap indicators which provide an indication of the overlap required to between a plurality of scanning cycles to allow stitching of the resulting plurality of images into one image.

Another significant object of the invention can be to provide a linear guide element coupled to or integral with the external surface of the portable image scanner which can be slidely engaged or repositioned against a linear guiding surface which allows a plurality of scanning cycles to be obtained across the scannable area of an article without a substantial amount of rotation in the portable scanner thereby allowing a plurality of images having sufficient overlap to be stitched together to produce a single image without substantial rotational compensation in processing the plurality of scans.

Another significant object of the invention can be to provide a portable image scanner which operates in the upright or inverted position to scan articles with scanning initiated by operation of a switch having a one piece switch button configured to wrap about a side of the image scanner to afford a portion of the external surface area of the switch button operably accessible on both the upper and lower external surfaces of the image scanner.

Another significant object of the invention can be to provide a portable image scanner having a scanner contained within an enclosed space defined by mated engagement of an upper housing and a lower housing correspondingly providing an upper transparent window and a lower transparent window having a light filter which reduces the amount of stray or reflected light to the scanned surface of the upper transparent window to improve the quality of the generated images.

Another significant object of the invention can be to provide a portable image scanner having a scanner contained within an enclosed space defined by mated engagement of an upper housing and a lower housing having a configuration which allows the boundary of the scanned area to be positionally fixed in close relation to objects having fixed location.

Naturally, further objects of the invention may be disclosed throughout other areas of the specification, drawings, photographs, and claims.

IV. A BRIEF DESCRIPTION OF THE DRAWINGS

FIG. 11 is an enlargement of a portion of the cross section view 10-10.

FIG. 12 is cross section view of a comparable portion of a reduced margin embodiment of the inventive image scanning system which reduced margin upper housing and reduced margin lower housing which allow for reduced margin image scanning of articles.

V. DETAILED DESCRIPTION OF THE PREFERRED EMBODIMENTS

Figure 1:
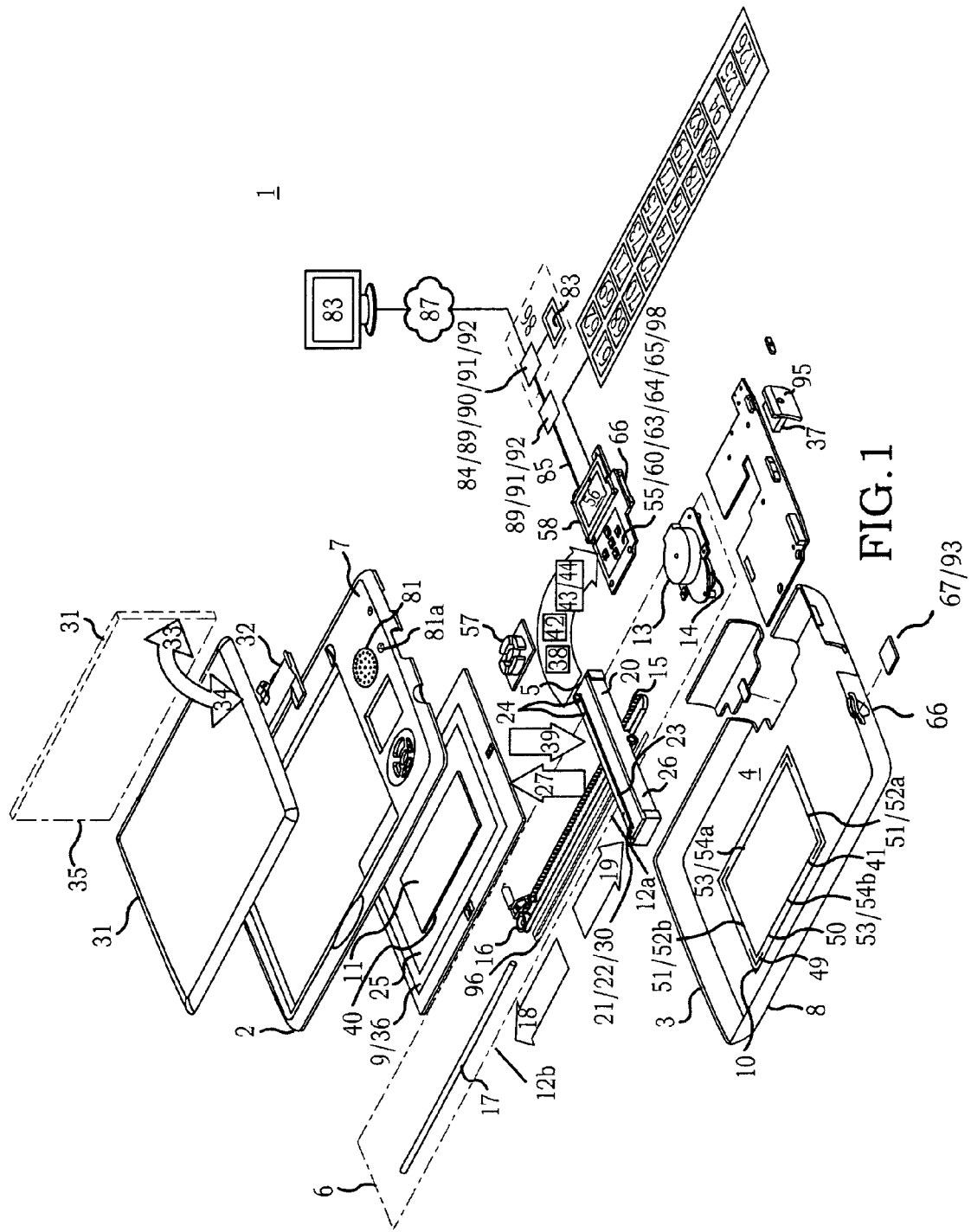
FIG. 1 is an exploded perspective view of a particular embodiment of the inventive image scanning system.

Now referring primarily to FIG. 1, which shows an exploded perspective view of an image scanning system (1) (also referred to as an "optical scanning system" or "optical scanner") which comprises an upper housing (2) and a lower housing (3) configured to mateably engage to provide a hollow inside space (4) of sufficient volume to contain in operable relation an image sensor (5) and an image sensor driver (6). The upper housing (2) and the lower housing (3) in mated engagement can each provide an substantially planar external face (7)(8) disposed in substantially opposed parallel relation. The substantially planar external faces (7)(8) of the upper housing (2) and lower housing (3) can respectively include an upper transparent window (9) and in certain embodiments further include a lower transparent window (10), each transparent window (9)(10) having a border defined by an opaque portion (36) of the external face (7)(8) where transparency is not required.

The term "substantially planar" for the purposes of this invention means having sufficient flatness to allow all or a portion of the scannable area (40) of an article (11) to be positioned downward upon the upper transparent window (9) or for the image scanning system (1) to be inverted and the upper transparent window (9) positioned upon all or a portion of the scannable area (40) of an upward facing article (11).

Embodiments of the upper housing (2) and the lower housing (3) including at least the upper transparent window (9) can be fabricated, molded, or otherwise formed from a material or combination of materials such as metal, plastic, glass, or the like. The upper housing (2) and lower housing (3) can be provided as one piece, two pieces, or a greater number of pieces depending upon the particular embodiment of the image scanning system (1).

The image sensor (5) and image sensor driver (6) can be operably arranged within the hollow inside space (4) defined by mateable engagement of the upper housing (2) and the lower housing (3). The image sensor driver (6) can include a motor (13) or other device which generates rotation in a drive wheel (14) or other element having a substantially circular perimeter. The circumference of the drive wheel (14) can be substantially smooth but can further provide teeth, grooves, or other elements which matingly engage a transmission means (15) circumferentially coupled about the drive wheel (14) and about a slave wheel (16) or other substantially circular element such that rotation of the drive wheel (14) generates circuitous travel of the transmission means (15) about the drive wheel (14) and the slave wheel (16). The transmission means (15) can comprise a belt, toothed belt, chain, cable, or the like having an external configuration which matingly engages the drive wheel (14) and the slave wheel (16) for circuitous travel.

The image sensor (5) can be coupled to the transmission means (15) and slidely coupled on guide shaft (17) such that circuitous travel of the transmission means (15) about the drive wheel (14) and the slave wheel (16) in a first direction urges the image sensor (5) along the guide shaft (17) in a first direction (18) and circuitous travel of the transmission means (15) in the opposite direction urges the image sensor (5) along the guide shaft (17) in a second direction (19). The arrangement of the motor (13), drive wheel (14), slave wheel (16), transmission means (15) and guide shaft (17) have an operable relation within the inside hollow space (4) such that the image sensor (5) travels along the guide shaft (17) from a first image sensor position (12a) a sufficient distance in the first direction (18) and from a second image sensor position (12b) in the second direction (19) to scan the sensed area (25) of the upper transparent window (9). Understandably, other mechanical assemblies could be utilized to generate travel of the image sensor (5) in relation to the upper transparent window (9).

As to certain embodiments of the invention, the image sensor (5) can be maintained in fixed relation with the upper transparent window (9) and movement of the upper transparent window (9) in relation to the surface of the article (11) generates a scan of the scannable surface (40) of the article (11).

As to certain embodiments, the image sensor (5) can be a contact image sensor (CIS) (21) mounted within a supporting framework (20). The CIS (21) mounts within the supporting framework (20) and the supporting framework (20) slidely coupled to the guide shaft (17) locates the CIS (21) at a substantially consistent distance from the upper transparent window (9) as the image sensor (5) travels along the guide shaft (17) from the first image sensor position (12a) to the second image sensor position (12b) to scan the sensed area (25) of the upper transparent window (9).

The CIS (21) can be in the configuration of a strip-shaped sensor element (22) having one or a linear array of detectors which can be covered by a focusing lens (23) and flanked by red, green and blue light emitting diodes ("LEDs") (24) for illumination of the sensed area (25) of the upper transparent window (9). One or more light blocking elements (26) direct the light (27) toward the upper transparent window (9). The light blocking elements (26) can comprise a pair of light blocking strips one each disposed on opposed lateral sides of the CIS (21). Alternatively, the light-blocking elements (26) can be a light blocking housing arranged around the CIS (21). Understandably, the light-blocking elements (26) can be configured in any manner which directs light (27) toward the upper transparent window (9) and blocks light (27) from the lateral sides (28)(29) (see for example FIG. 7) of the strip-shaped sensing element (22).

The light-sensing elements (30) of the sensor element (22) can provide a silicon surface which can be divided up into a plurality of discrete square cells, each having dimensional relations depending upon the required scanning resolution (for example a 400 dpi scanner will use a CIS whose cells are 1/400" across). A portion of the light (27) emitted toward the upper transparent window (9) can be directed from the surface of the article (11) onto the silicon surface. This type of optical system is 1:1, there is no reduction or enlargement; and this results in a scanner having the greatest resolving power and geometric accuracy.

Figure 2:
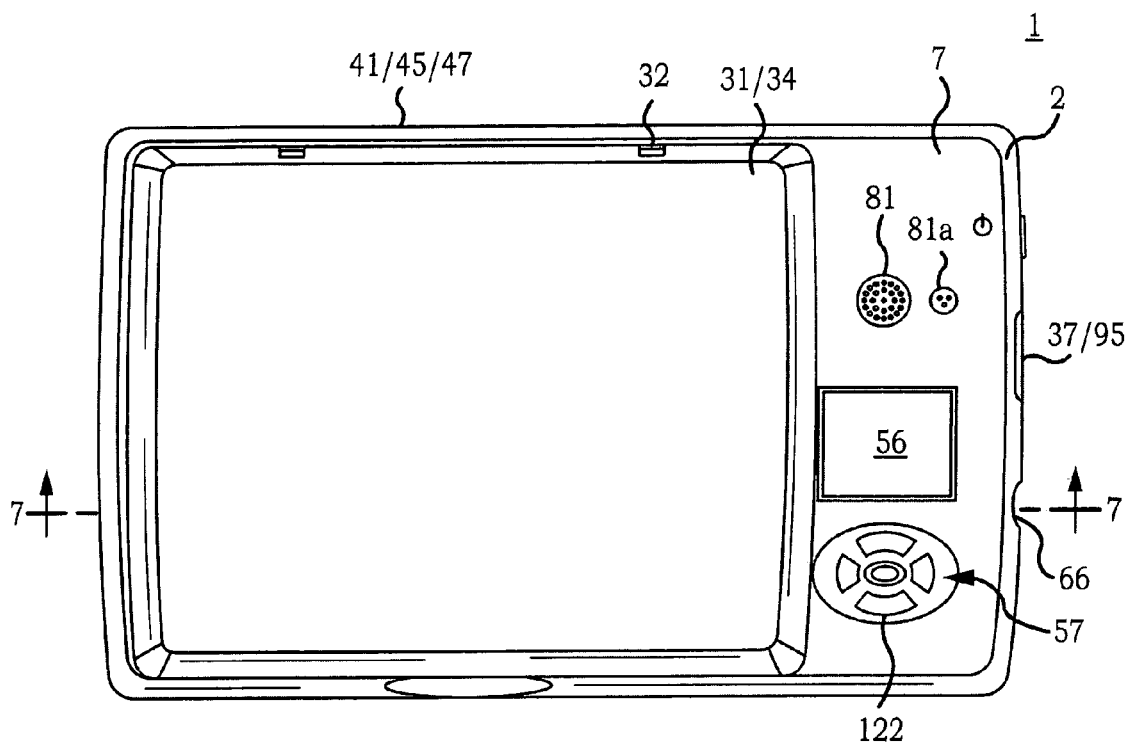
FIG. 2 is a plan view of a particular embodiment of the inventive image scanning system.
Figure 3:
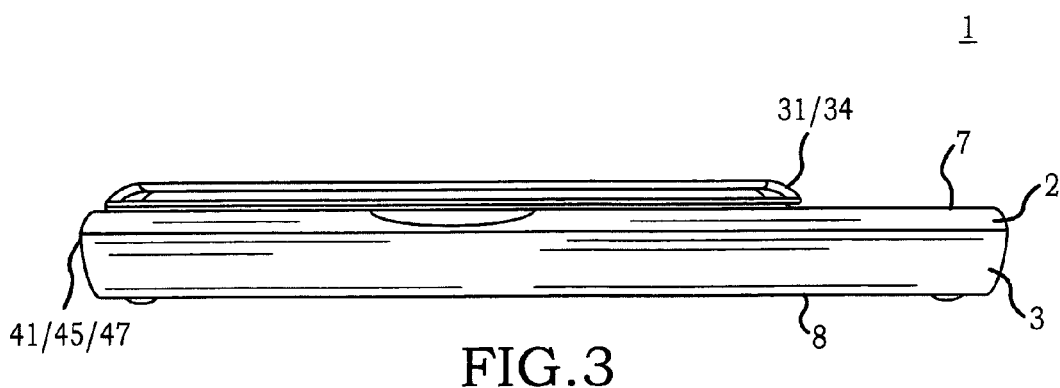
FIG. 3 is a front side view of a particular embodiment of the inventive image scanning system.
Figure 4:
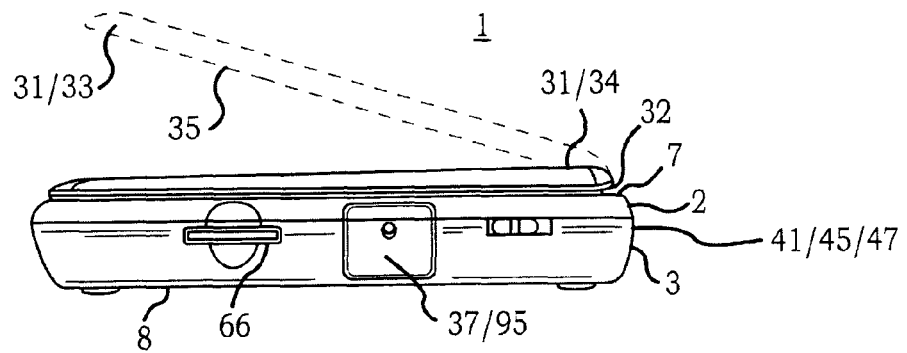
FIG. 4 is an end view of a particular embodiment of the inventive image scanning system.

Now referring primarily to FIGS. 2-5, particular embodiments can further provide a cover (31) rotatably mounted to the upper housing (2) by a hinge element (32) between an open position (33) and closed position (31) (see for example FIG. 3). In the closed position (34), the inside cover surface (35) the upper transparent window (9). The cover (31) can have sufficient dimensional relations to cover all or substantially the entirety of the upper transparent window (9). The hinge element (32) has a configuration which allows the cover (31) to be releasably attached in relation to the upper housing (2).

Figure 5:
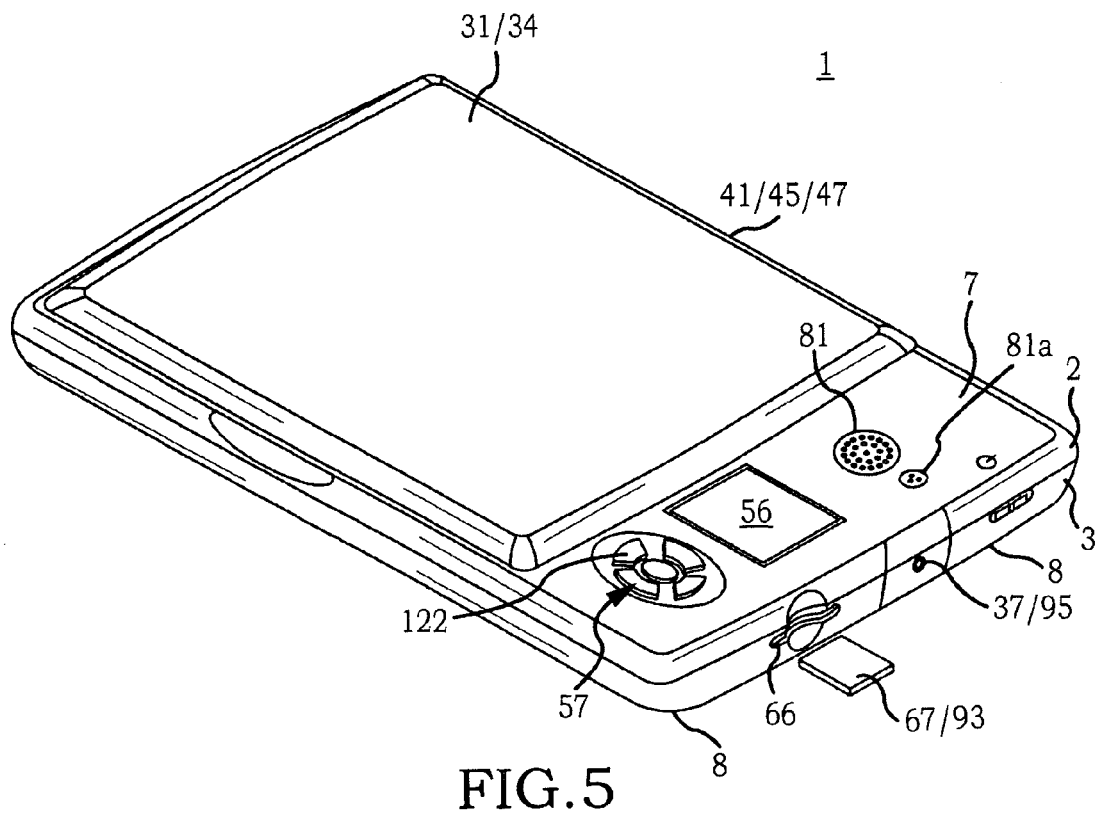
FIG. 5 is a perspective plan view of a particular embodiment of the inventive image scanning system.

Now referring primarily to FIGS. 1-5, as to certain embodiments of the image scanning system (1), the upper transparent window (9) can be disposed facing upward to scan an article (11). The cover (31) can be established in the open position (33) and the article (11) positioned with the scannable area (40) facing downward on the upper transparent window (9). The cover (31) can then be established in the closed position (34) over the article (11) (as shown in FIG. 5). By operation of a switch (37) the scanning cycle (42) commences in which the image sensor (5) travels along the guide shaft (17) from a first image sensor position (12a) a sufficient distance for the article (11) (or a portion of the article (11)) to be illuminated by the LEDs (24) and a portion of the light (27) reflectively directed (reflected light (39)) to the CIS (21) (sensor element (22)) to generate a signal (38) which varies in relation to differences in the amount of reflected light (39) from the surface of the article (11).

Figure 6:
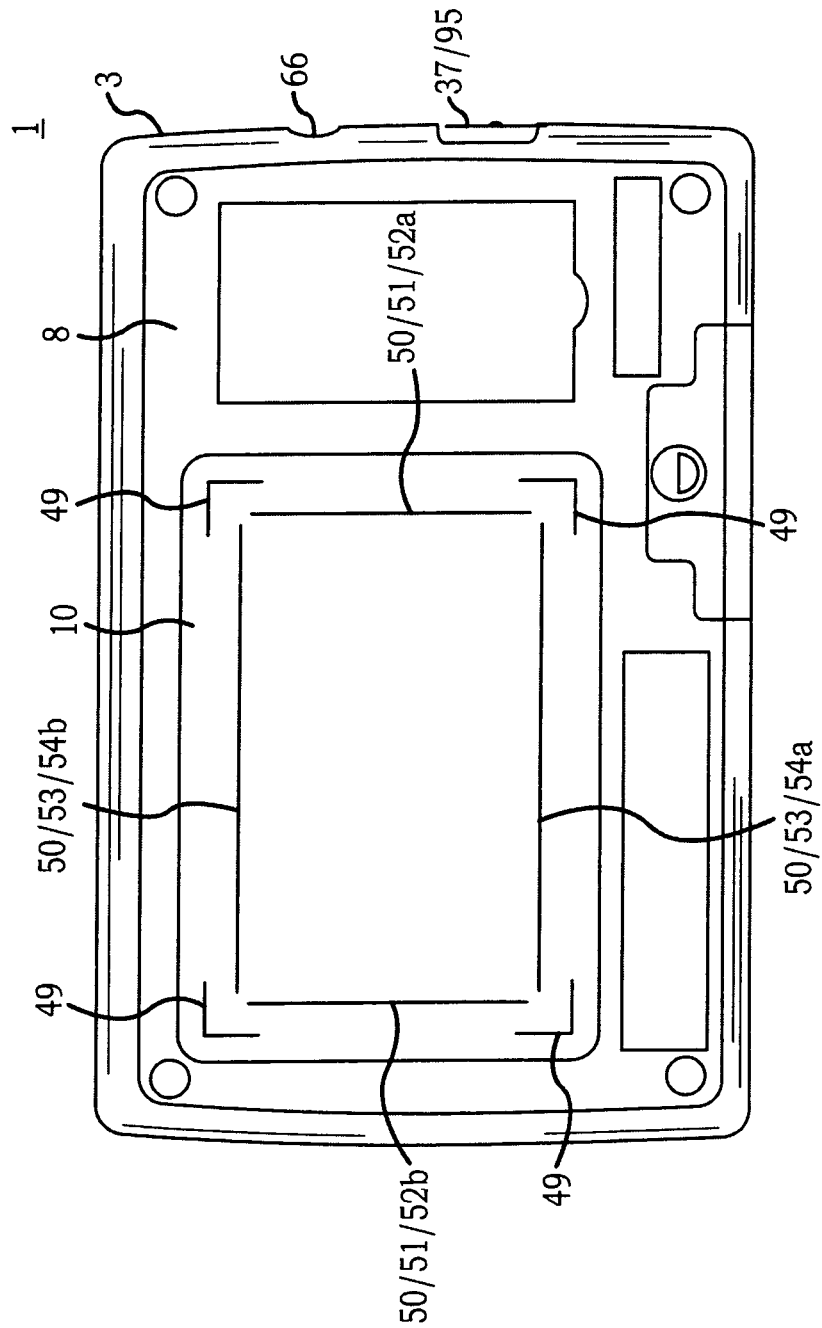
FIG. 6 is bottom view of a particular embodiment of the inventive image scanning system.
Figure 13:
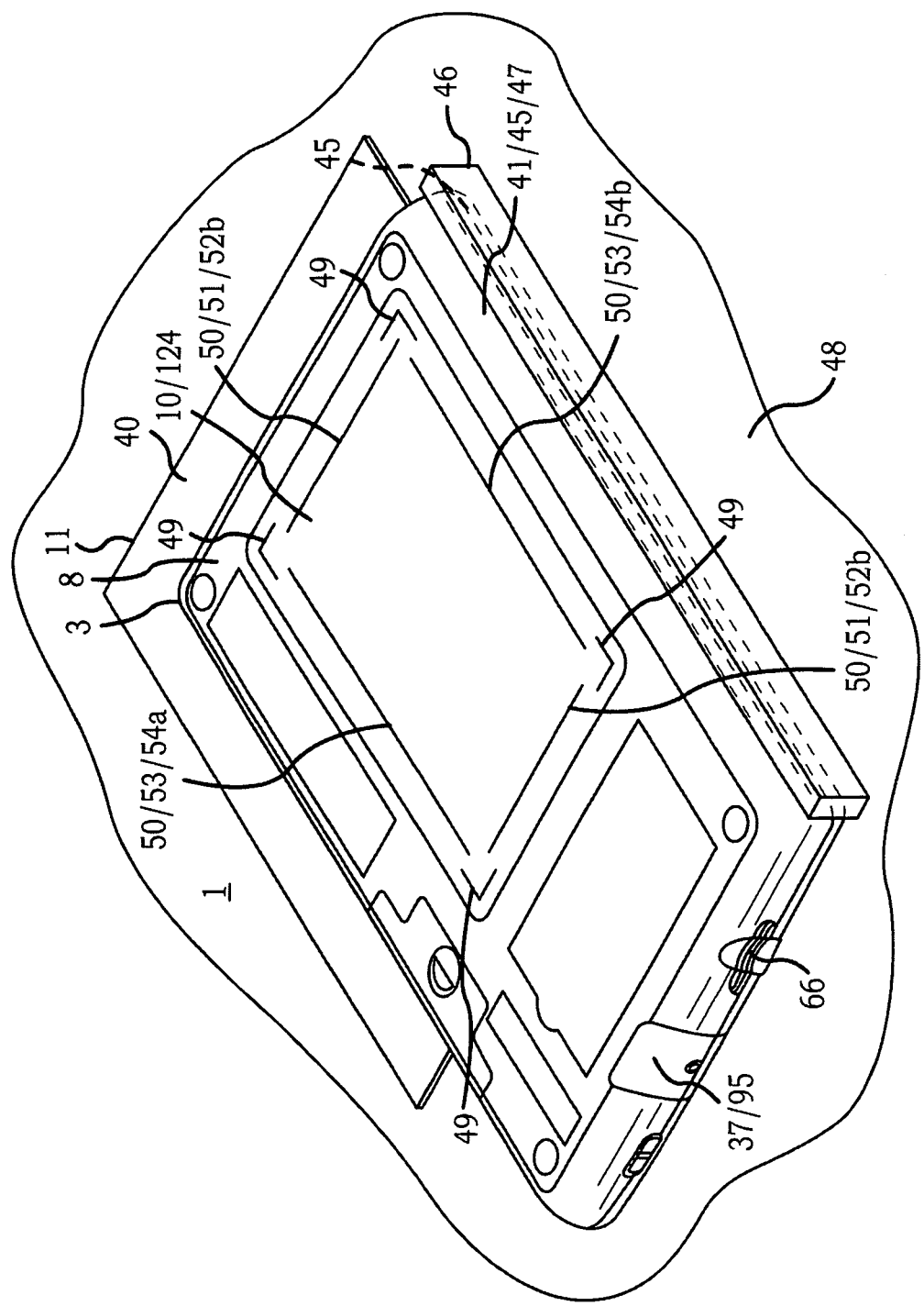
FIG. 13 is bottom perspective view of a particular embodiment of the image scanning system which includes an upper housing and lower housing having a linear guide element for engagement with a linear guiding surface.

Now referring primarily to FIG. 6, in the alternative, the cover (31) can be released from the upper housing (2) which allows the image scanning system (1) to be inverted allowing the sensed area (25) of the upper transparent window (9) to be disposed in downward facing engagement with the upwardly facing scannable area (40) of an article (11) (see for example FIG. 13). Because the image scanning system (1) can dispose the upper transparent window (9) in the upward facing condition (upright) or downward facing condition (inverted) the switch (37) can be configured to provide a first switch and a second switch one each accessible in the upward facing or downward facing condition of the upper transparent window (9). An alternative embodiment of the switch (37) (see for example FIGS. 4 and 5) provides a single one piece switch button (95) having a configuration which wraps sufficiently about the side of the mated upper housing (2) and lower housing (3) to dispose a portion of the switch button (95) accessible regardless as to whether the upper transparent window (9) has utilization in the upward facing condition or downward facing condition for scanning an article (11).

Figure 7:
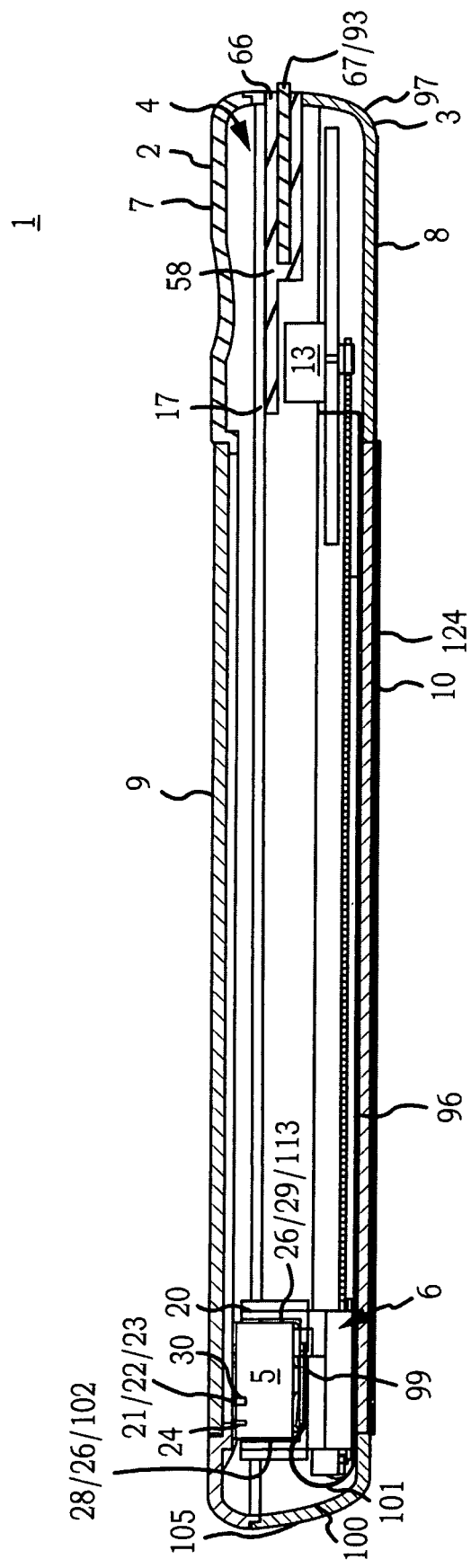
FIG. 7 is a side view cross section 7-7 of the particular embodiment of the inventive image scanning system shown in FIG. 2 further providing an anti-reflective layer coupled to the upper transparent window.

Now referring primarily to FIG. 7, certain embodiments of the invention can further include an upper transparent window having a scanned area (25) and a lower transparent window (10) which allows alignment of the scanned area (25) with the scannable area (40) of an article (11). A light filter can be coupled to the lower transparent window (10) to reduce or avoid stray light or from light being reflected from the lower transparent window (10) to the scanned area (25) of the upper transparent window (10) to improve or avoid reduction in quality of the image (43). The light filter (124) passes light incident in substantially perpendicular relation to the surface of the lower transparent window (10) but blocks light incident at about 45 degrees to the surface of the lower transparent window (10) (or incident at an angle that generates stray light or reflects light that lessens the quality of images generated). As but one non-limiting example, the material available through 3M Optical Systems Division as LCD privacy filters used in PN PF 28.0W can be utilized.

Now referring primarily to FIG. 13, an article (11) having a scannable area (40) greater than the sensed area (25) of the upper transparent window (9) can require serial acquisition of a plurality of scanning cycles (42) each over a portion of the scannable area (40) of the article (11). The plurality of scanning cycles (42) can be acquired in relation to a single dimension of the article (11) or two dimensions the article (11). For example, the upper transparent window (9) can be serially positioned linearly in one direction (vertically or horizontally) or in both directions (vertically and horizontally) between scanning cycles (42). Rotation of the sensed area (25) of the upper transparent window (9) in relation to the article (11) between each of a plurality of scanning cycles (42) correspondingly creates a plurality of images (43) that can require translation with rotation to correctly stitch the plurality of images (43) into a single image (44) or which cannot be stitched together.

The term "image" means the portion of the scannable area (40) of an article (11) transformed by the image scanning system (1) during a scanning cycle (42) into a digital representation of the scannable area (40) retrievable stored in a memory element (60) for subsequent monitor display or rendering in a tangible form.

The term "stitched" for the purposes of this invention means computer implemented processing of the data generated by two or more scanning cycles (42) of the image scanning system (1) each one of the plurality of scanning cycles (42) having sufficient overlap with at least one other of the plurality of scanning cycles (42) to allow the overlapped data to be matched to allow the production of a single image (44) from more than one of the plurality of scanning cycles (42).

Again referring primarily to FIG. 13, a linear guide element can be coupled to the upper housing (2) or the lower housing (3) (or both) to reduce or avoid rotation of the sensed area (25) of the upper transparent window (9) (or rotation of the image scanning system (1)) in relation to the article (11) between serial scanning cycles (42). The linear guide element (45) (configured as one continuous piece or as discontinuous pieces) provides along at least one side (47) of the housing (2)(3) a linear external surface (41) (the term "linear" as used herein means a substantially straight). The linear external surface (41) can be engaged against a linear guiding surface (46).

The linear guiding surface (46) can have fixed engagement in relation to a supporting surface (48) on which the article (11) can be located with the scannable area (40) upwardly facing. The linear guide element (45) can be located to abut the linear guiding surface (46) with the scannable area (40) of the article (11) facing upward between the upper transparent window (9) and the supporting surface (48). A portion of the scannable area (40) can be viewed through the lower transparent window (10). Upon completion of each of a plurality of scanning cycles (42) the linear guide element (45) of the image scanning system (1) can be serially repositioned against or slidely positioned along the linear guiding surface (46) to position portions of the scannable area (40) of the article (11) in relation to the upper transparent window (9) to reduce or avoid rotation of sensed area (25) of the upper transparent window (9) in relation to the article (11).

Now referring primarily to FIG. 6, the upper transparent window (9) can further include viewable indicator marks (49) which define the bounds of the sensed area (25) of the upper transparent window (9). The portion of the scannable area (40) of the article (11) disposed inside the sensed area (25) of the upper transparent window (9) within the bounds defined by the indicator marks (49) will be sensed by the CIS (21). The portion of the scannable area (40) of the article (11) disposed outside of the sensed area (25) of the upper transparent window (9) having bounds defined by the indicator marks (49) will not be sensed by the CIS (21). The viewable indicator marks (49) can be viewed through the lower transparent window (10), such that the upper transparent window (9) can in the downwardly facing condition be positioned on scannable area (40) of the article (11) such that the desired portion of the scannable area (40) occurs within the sensed area (41) of the upper transparent window (9).

Again referring primarily to FIG. 6, the lower transparent window (10) can further include viewable overlap indicators (50) which define the portion of the sensed area (25) of the upper transparent window (9) to overlap between each of a plurality of scanning cycles (42) to allow stitched assembly of the corresponding plurality of images (43) into a single image (44). The viewable overlap indicators (50) can indicate the amount of overlap of the sensed area (25) between any two of a plurality scanning cycles (42) to allow stitched horizontal assembly of the corresponding plurality of images (43). Similarly, the viewable overlap indicators (50) can indicate the amount of overlap of the scanned area (41) between any two scanning cycles (42) to allow stitched vertical assembly of the corresponding plurality of images (43) (or allow both stitched vertical and horizontal assembly) into a single image (44).

One non-limiting embodiment of the viewable overlap indicators (50) can comprise a pair of viewable vertical lines (51) viewable in the lower transparent window (10) disposed in substantially vertical parallel opposed relation a distance apart. As one non-limiting example of a method of using the viewable overlap indicators (50), a first viewable vertical line (52a) can be positioned in relation to a location in the scannable area (40) of the article (11) and a first of a plurality of scanning cycles (42) achieved. The image scanning system (1) can be repositioned horizontally on the scannable area (40) of the article (11). A second viewable vertical line (52b) can be positioned at the same location as the first vertical line (51a) was positioned for the preceding first of the plurality of scanning cycles (42) and a second of the plurality of scanning cycles (42) can be achieved. Thus, sufficient horizontal overlap of the scannable area (40) of article (11) (or sensed area (25) of the upper transparent window (9)) between the first and second of a plurality of scanning cycles (42) can be achieved to allow stitching of the correspondingly generated plurality of images (43) of the scannable area (40) into a single image (44).

Similarly, a pair of viewable horizontal lines (53) viewable in the lower transparent window (10) disposed in substantially horizontal parallel opposed relation a distance apart. A first viewable horizontal line (54a) can be positioned in relation to a location in the scannable area (40) of the article (11) and a first of a plurality of scanning cycles (42) achieved. The image scanning system (1) can be repositioned vertically on the scannable area (40) of the article (11). A second viewable vertical line (54b) can be positioned at the same location as the first vertical line (54a) was positioned for the preceding first of the plurality of scanning cycles (42) and a second of the plurality of scanning cycles (42) can be achieved. Thus, sufficient vertical overlap of the scannable area (40) of article (11) (or sensed area (25) of the upper transparent window (9)) between the first and second of a plurality of scanning cycles (42) can be achieved to allow stitching of the correspondingly generated plurality of images (43) of the scannable area (40) into a single image (44).

Now referring primarily to FIGS. 1 and 2, particular embodiments of the invention can further include a display screen (56). As a non-limiting example, the display screen (56) can be a liquid crystal device ("LCD") or other display device suitable for display of graphic images, alphanumeric characters, symbols, or the like recognizable to the user. A scanner control interface (57) can provide two-dimensional movement of a visible symbol (pointer) on the display screen (56) which allows the user to control the functionalities of the image scanner system (1), as further described below. Many implementations of the scanner control interface (57) are known in the art including a trackball, mouse, joystick or keys capable of signaling movement of a given direction or manner of displacement. The scanner control interface (57) can be utilized to access and utilize the functionalities of an operating system program (61) of an internal computer (58).

Again referring primarily to FIG. 1, the image scanning system (1) can further include an internal computer (58) which can use a non-volatile main memory (60) in lieu of random access memory. The non-volatile main memory (60) stores an operating system program (61) and an application program (62). The operating system program (61) and the application program (62) used by the internal computer (58) can be retained in an initialized and executable state within the non-volatile main memory (60) when the internal computer (58) of the scanning system (1) is powered off. The operating system software (61) and application program (62) can be used by the image scanning system (1) during boot up and while operating after boot up. The non-volatile main memory (60) can be read from and written to. It is appreciated that a read only memory (55) may be included and non-volatile main memory (60) may be separate elements or integrated as a single element. The non-volatile main memory (60) can be used in the image scanning system (1) to provide a processor (63) and CPU registers (64). FeRAM (ferromagnetic or ferroelectronic RAM), flash memory, or various other types of non-volatile memory can be used for the non-volatile main memory (60), cache memory (65) or CPU registers (64).

The internal computer (58) can further include a memory card reader (66) for reading from or writing to a removable memory card (67); however, the invention is not so limited and in the alternative the internal computer (58) can include one or more of a magnetic disk drive for reading from or writing to a removable magnetic disk, and an optical disk drive for reading from or writing to a removable optical disk such as a CD ROM or other optical media, a flash drive reader for reading from or writing to a removable flash drive, or the like.

The processor (63) interacts with either or both non-volatile main memory (60) and non-volatile cache memory (65), as well as with CPU registers (64). In accordance with the present invention, the controlling logic executed by processor (63) enables the processor (63) to read from and write to the non-volatile main memory (60) or other non-volatile memory. During normal operation of the image scanning system (1) the application program (62) is read from non-volatile main memory (60) and executed. Information generated during normal operation of the image scanning system (1) can be written to the non-volatile main memory (60).

The internal computer (58) implemented functionalities of the image scanning system (1) shown in FIG. 1 as functional block components are more fully described below as optional selections or various processing steps. It should be appreciated that such functional blocks may be realized by any number of hardware or software components configured to perform the specified functions. For example, the present invention may employ various integrated circuit components which function without limitation as memory elements, processing elements, logic elements, look-up tables, or the like, which may carry out a variety of functions under the control of the processor (63) or other control devices.

Similarly, the software elements of the present invention may be implemented with any programming or scripting language such as C, C++, Java, COBOL, assembler, PERL, Labview, or any graphical user interface programming language, extensible markup language (XML), Microsoft's Visual Studio .NET, Visual Basic, or the like, with the various algorithms or Boolean Logic being implemented with any combination of data structures, objects, processes, routines or other programming elements. Further, it should be noted that the present invention might employ any number of conventional techniques for data transmission, signaling, data processing, network control, and the like.

It should be appreciated that the particular computer implemented functions shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware based computer systems which perform the specified functions or steps, or suitable combinations of special purpose hardware and computer instructions.

Again referring primarily to FIG. 1, the internal computer (58) implemented functions of the application program (62) can provide a power management module (68) which functions to adjust power consumption of the image scanning system (1) depending upon operational status and can for example switch between a scanning mode (69) when transmitting a signal (38) during scanning of an article (11), a receive mode (70) for receiving data packets or signal transmission, an idle mode (71) when the scanner system is neither scanning or receiving packets or signal transmission, and a sleep mode (72) in which scanning and signal transmission and receiving packets cannot occur and the scanner system (1) must be woken to the idle mode (71) by explicit instruction.

The software program (62) can further provide a signal translation module (73) which functions to translate signals (38) received from the image sensor (5) into an image (44) or a plurality of images (43) representing variation in the amount of light (27) reflected by portions of the scanned area (41) of an article (11). The signal translation module (73) can further operate to display the image (44) on the display screen (56) as the signal (38) is translated during scanning. The signal translation module (73) can further function to store image(s) (43)(44) generated into the non-volatile main memory (60).

The application program (62) can further provide an image review module (74) which functions to allow retrieval and serial viewing of image(s) (43)(44) stored into the non-volatile main memory (60). The application program (62) can further provide a zoom module (75) which functions to enlarge or reduce the angle of view of all or a portion of the image (44) within the display screen (56) and can further provide a pan function (76) which allows repositionable view of an area of the scanned image (43) within the display screen (56). The application program (62) can further provide an image resolution selection module (77) which functions to adjust image resolution in relation to a particular zoom level.

The software application can further provide an image enhancement module (78) which allows adjustment of color, brightness, sharpness, contrast, image size, noise and crop and removal of unwanted elements, or the like.

The application program (62) can further provide a data embedding module (125) which can function to embed metadata into the scanned image (44). For the purposes of this invention the term "metadata" broadly encompasses data which is made a part of an image (44) used to describe the definition, structure, and administration of the image (44) with all contents in context to facilitate subsequent use of the image (44). The data embedded in the image (44) as non-limiting examples can specify the tools used to create the image (44), how large the image is, the color depth, the image resolution, exposure data, when the image was created as to date and time, demographic data, distribution data, who owns the image, copyright information, contact information, image content information, metatags, geographic, geological information, global positioning system data, or the like and can include entire data files such as portable document format (PDF) files, digital audio encoding format such as MP3 files, video files, audio files, Word files, Xcel file format files, encryption, and security information or data and instructions to retrieve data files from a memory element, or remote computer whether in a LAN or WAN setting, or instructions relating to the display of image in relation to retrieval, indexing, sorting, identification, and playback of embedded or retrieved data files, or like. The data can be embedded consistent with ISO 32000 or "Exchangeable image file format for digital still cameras Exif Version 2.2 (2002), hereby incorporated by reference herein.

The application program (62) can further provide a date-time module (79) which can function to provide date and time information related to an image (43) and by operation of the data embedding module (125) can be coupled or embedded as metadata in the image (43) and stored to the non-volatile main memory (60) whether the date and time is entered using the control device (57) or automatically generated and embedded by operation of the application program (62).

The application program (62) can further include an audio record and playback function (80) which allows sound (such as voice, music, background sound, mp3 encoded format, or the like) by use of sound input elements (81a) to be recorded and coupled or embedded to one or more images (43) for later playback on retrieval of the image (44) through sound output elements (81) typically coupled to the upper housing (9) of the scanner system (1). Associated sound output controls (82) can be operated by use of the scanner control interface (57).

While the portable scanner system can be operated and can be fully independent of any other computer, certain functions can be operated in the networked environment using logical connections (85) to one or more external computers (83). These logical connections (85) are achieved by a communication device (84) coupled to the internal computer (58) above described. The logical connections (85) depicted in FIG. 1 can include a local-area network ("LAN") (86) or a wide-area network ("WAN") (87). Such networking environments are commonplace in offices, enterprise-wide computer networks, intranets and the Internet.

Embodiments of the scanner system (1) used in a LAN (86) networking environment can be connected through a network interface (89) or adapter. Embodiments of the image scanning system (1) used in a WAN (87) networking environment, can further include a modem (90) or any other type of communications device for establishing communications over the WAN (87), such as the Internet. The modem (90) which may be internal or external to internal computer (58) via a serial port interface (91). In a networked environment, the image scanning system (1) can further include wireless interfaces (92) such as WiFi or cell phone interfaces. Scanned images (43) can be retrieved from storage in the non-volatile main memory (60) and can be uploaded individually or in batches to a website or FTP server for easy download to external computers (83). Conversely, image(s) (43)(44) can be downloaded from other websites and stored in the non-volatile main memory (60) of the internal computer (58). A particular non-limiting embodiment of the image scanning system (1) functions upon insertion of a memory card (67) or flash drive (93) to launch a website (94) constructed for the particular image scanning system (1).

The application program (62) can further provide a geographical position system ("GPS") module (126) which functions to identify location of the scanner system (1). The location data can be embedded with date-time information generated by the date-time module (79) of the image scanning system (1).

While the computer means and the network means shown in FIG. 1 can be utilized to practice preferred embodiments of the invention including the best mode, it is not intended that the description of the best mode of the invention or any preferred embodiment of the invention be limiting with respect to the utilization of a wide variety of similar, different, or equivalent computer means or network means to practice embodiments of the invention which include without limitation hand-held devices, such as personal digital assistants or camera/cell phone, multiprocessor systems, microprocessor-based or programmable consumer electronics, network PCs, minicomputers, mainframe computers, PLCs, or the like.

Figure 8:
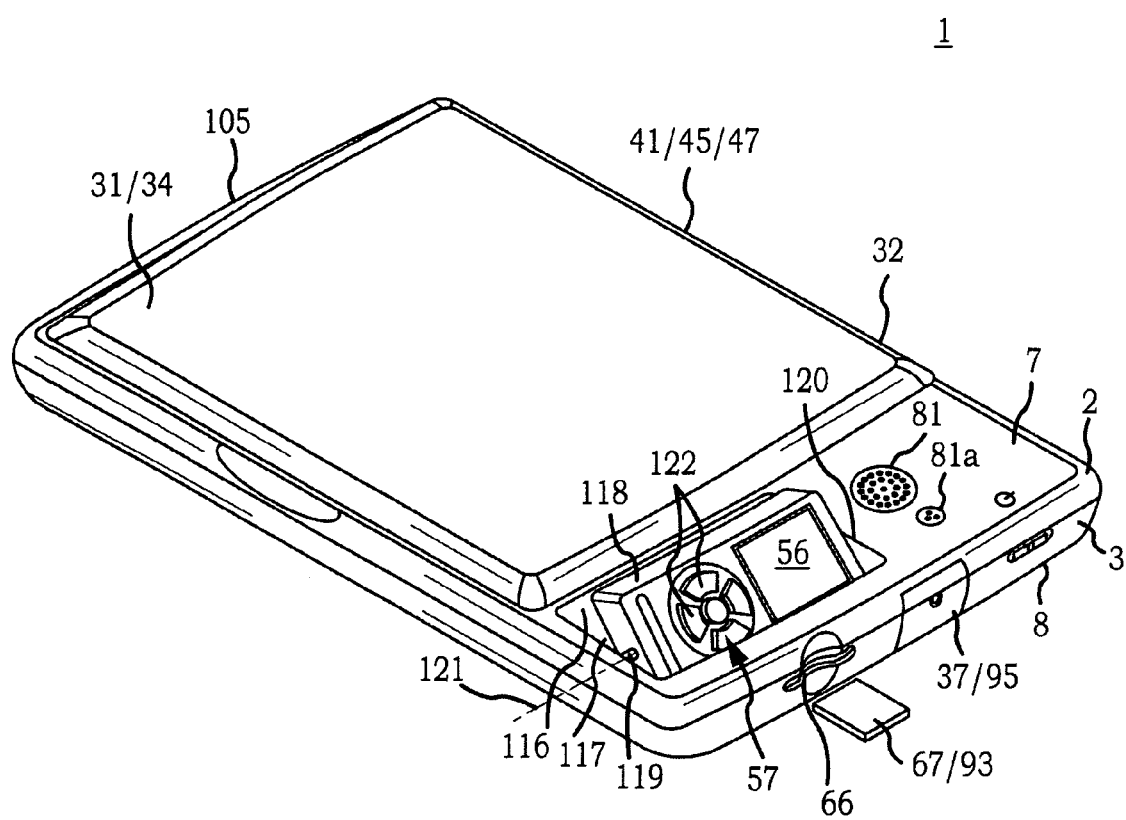
FIG. 8 is a perspective plan view of a particular embodiment of the inventive image scanning system which includes a scanner control interface rotates within a pass-through aperture accessibly locate scanner interface controls at the external surface of the upper housing or at the external surface of the lower housing.
Figure 9:
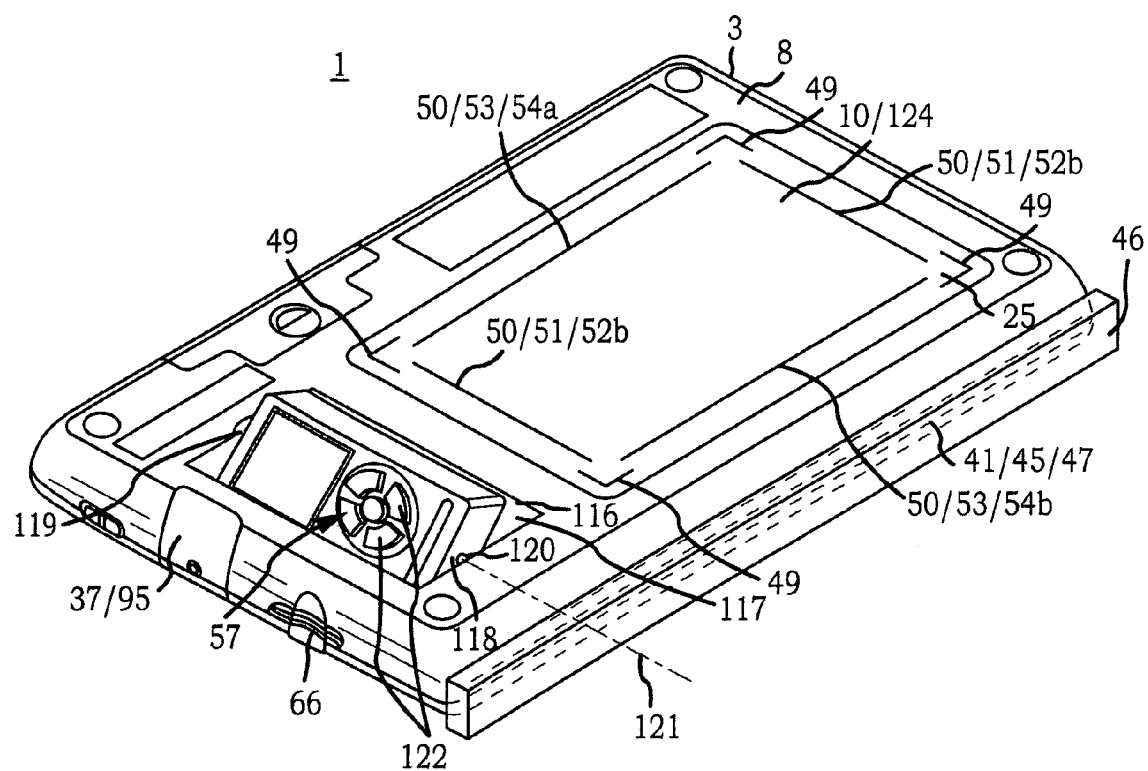
FIG. 9 is a bottom perspective view of a particular embodiment of the inventive image scanning system which includes a scanner control interface rotates within a pass-through aperture accessibly locate scanner interface controls at the external surface of the upper housing or at the external surface of the lower housing.

Now referring primarily to FIGS. 8 and 9, certain embodiments of the image scanning system (1) can include an upper housing (2) having an upper transparent window (9) and a lower housing (3) having a lower transparent window (10) which matingly engages the upper housing (3) to define a hollow inside space (4) and a pass-through aperture (116) which provides a passage (117) between substantially planar external faces (7)(8) of the upper housing (2) and the lower housing (3). A control interface housing (118) can have an external configuration which can be rotatably mounted within the passage (117) defined by the pass-through aperture (116).

As shown in FIGS. 8 and 9, as one non-limiting example, the pass-through aperture can have a generally rectangular configuration and the control interface housing (118) can have a generally rectangular configuration of sufficiently lesser dimensional relations to allow the control interface housing (118) to rotate within the passage (117) about pivot elements (119)(120) on the longitudinal axis (121) of the control interface housing (118). In the non-limiting example shown in FIGS. 8 and 9, the control interface housing (118) locates within the internal computer (58) and the memory card reader (66) which operates as above described to control the functionalities of the image scanning system (1), as above-described; the display screen (56); and the scanner control interface (57) which provides user interface control elements (122). Rotation of the scanner control interface housing (118) within the pass-through aperture (116) allows the user interface control elements (122) to be disposed at either one of the substantially planar external faces (7)(8) of the upper housing (2) or the lower housing (3) which allows use of the user interface control elements (122) to control the function of the image scanning system (1) and allows viewing of the display screen (56) in either the upward facing condition or downward facing condition, as above-described.

Figure 10:
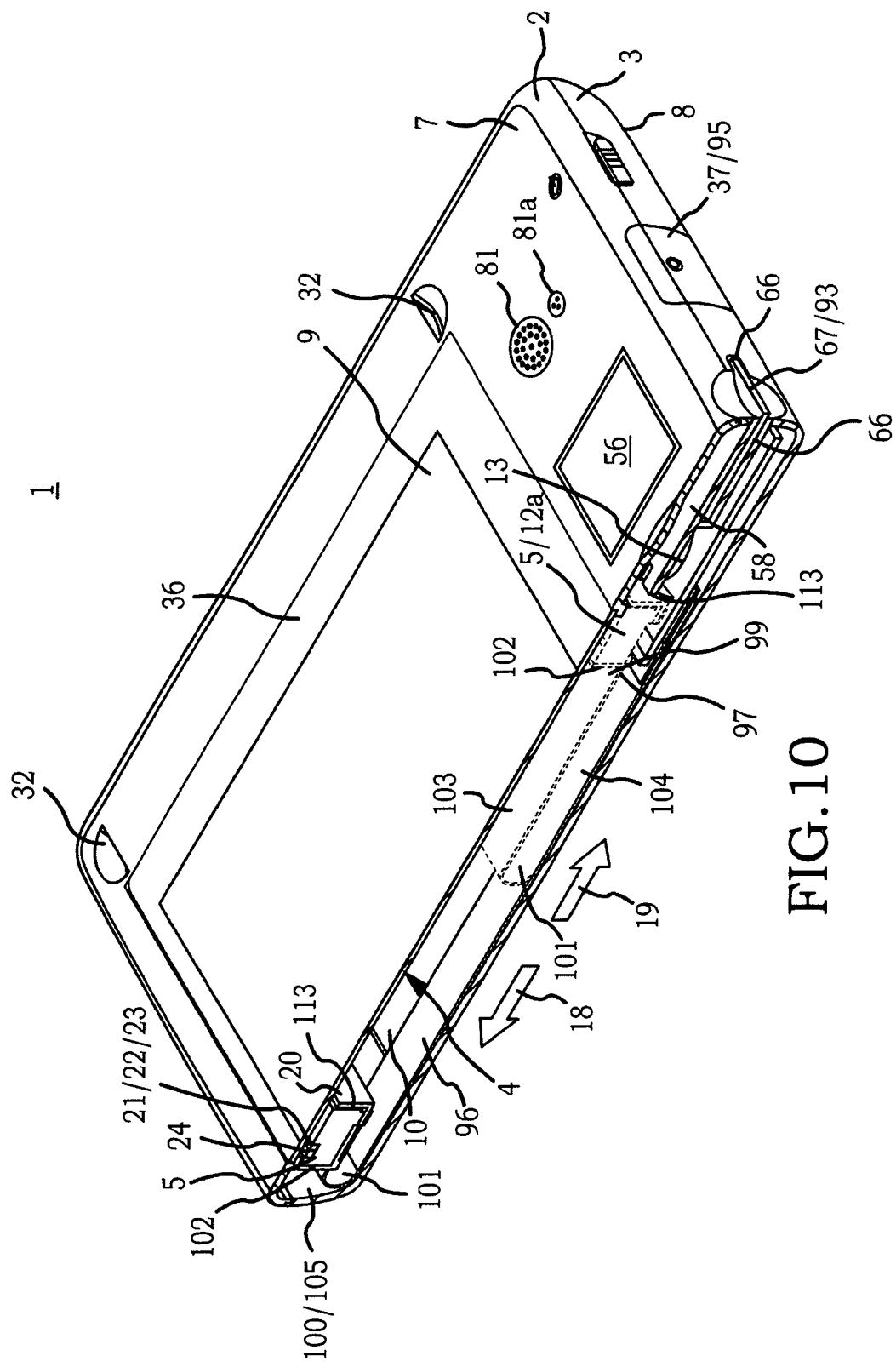
FIG. 10 is a perspective view cross section 10-10 of the particular embodiment of the inventive image scanning system shown in FIG. 5.

Now referring primarily to FIGS. 10 and 11, which provides a cross section view showing the image sensor (5) which is driven, as above described, in a first direction (18) from a first image sensor position (12a) toward a second image sensor position (12b) to scan the scannable area (40) of an article (11) for generation of an image (44). The image sensor (5) can then be driven in a second direction (19) from the second image sensor position (12b) toward the first image sensor position (12a). Through out travel of the image sensor (5) between the first image sensor position (12a) and the second image sensor position (12b), the image sensor (5) including the strip shaped sensor element (22) and the light emitting diodes (24) receives power and transmits signals (38) through a flexible electrically conductive ribbon (96) (also referred to as the "conductive ribbon") having a first end (97) electrically coupled to a power source (98) and the internal computer (58) and a second end (99) electrically coupled to the image sensor (5). The conductive ribbon (96) can take the form of an electrically conductive wire(s) disposed on a flexible electrically insulating substrate. As a non-limiting example, a conductive ribbon or ribbon cable suitable for use is available from Digi-Key Corporation, Part No. PS-1636; however, the invention is not so limited and a numerous and wide variety of flexible ribbon cables can be used or modified for use with embodiments of the invention, as further described below.

As shown in FIG. 10, when the image sensor (5) has a location at the second image sensor position (12b) the conductive ribbon (96) generally lies against the internal surface (100) of the lower housing (3), passes under the image sensor (5), and provides a loop element (101) proximate the second end (99). The loop element formed proximate the second end (99) allows the second end (99) to be presented to the image sensor (5) inwardly from the internal surface (100) of the side wall (105) of the joined upper housing (2) and lower housing (3) (as shown for example in FIG. 11). As the image sensor (5) returns toward the first image sensor position (12a) a first portion (103) (see FIG. 10 (broken line)) of conductive ribbon (96) can be drawn over a second portion (104) of the conductive ribbon (96) which lies against the internal surface (100) of the lower housing (3) to locate the loop (101) at a location at about the midpoint between the first image sensor position (12a) and the second image sensor location (12b) (as shown in FIG. 10 (broken line)). The upper housing (2) and the lower housing (3) can have a configuration which provides sufficient hollow inside space (4) between the internal surface (100) of the side wall (105) of the joined upper housing (2) and lower housing (3) and the first image sensor side (102) to accommodate the loop (101) of the flexible conductive strip (96) when the image sensor (5) locates at the second image sensor position (12b).

Now referring primarily to FIGS. 11 and 12, an article (11) may be connected or otherwise coupled to an object (107) in fixed relation. The object (107) may prevent alignment of the sensed area (25) of the upper transparent window (9) of the image scanning system (1) with all or a portion of the scannable area (4) the article (11). As one non-limiting example, the article (11) to be scanned may be a page (108) of a book (109). The object (107) may be the spine (110) of the book (109) to which the page (108) is bound proximate an edge (111). The side wall (105) of image scanning system (1) can be forcibly urged against the spine (110) of the book (109) but may not be positionally fixed over the spine (110) of the book (109). Moreover, the margin (106) between the spine (110) and the imprinted area (123) of the page (108) may not be sufficient to allow alignment of the sensed area (25) of the upper transparent window (9) and the imprinted area (123). Because the margin (106) cannot be increased and because the side wall (105) configuration of the upper housing (2) and the lower housing (3) (for example as shown in FIGS. 10 and 11) cannot be readily altered, it may not be possible to positionally fix the upper transparent window (9) in relation to the article (11) to obtain a complete image (44) of the imprinted area (123) on the page (108). This example is intended to be illustrative and not limiting with respect to the types of objects (107) and articles (11) which may have a fixed relation which prevents certain configurations of the image scanning system (1) from being positionally fixed in relation with the article (11) for alignment of the scannable area (40) of the article (11) with the sensed area (25) of the upper transparent window (9).

Again referring primarily to FIG. 11, particular embodiments of the image scanning system (1) can be configured to allow an article (11) to be scanned, as above-described, even when the article (11) has a margin (106) which affords limited open space in which to positionally fix the image scanning system (1) to align the scanned area (41) of the upper transparent window (9) with the scannable area (40) of the article (11). As to these embodiments of the image scanning system (1), the upper housing (2) and lower housing (3) can be configured to provide side wall (105) having an external configuration which provides a generally flat surface (112) in substantially perpendicular relation to the substantially planar external faces (7)(8) of the upper housing (2) and the lower housing (3).

Additionally, the upper housing (2) and lower housing (3) can further provide an internal surface (100) of the side wall (105) configured with a substantially flat surface disposed in generally perpendicular relation to the substantially planar external faces (7)(8) of the upper housing (2) and the lower housing (3). As to certain non-limiting embodiments of the invention as shown for example in FIG. 12, the side wall (105) can have a thickness between the external surface and the internal surface (100) sufficient to support the upper transparent window (9), which substantially eliminates any opaque portion (36) of the substantially planar external faces (7)(8), except for the thickness of that portion of the side wall (105) which supports the upper transparent window (9). As non-limiting example, the thickness of the sidewall (105) can be about one-quarter of an inch and the upper transparent window can engage about the inner one-half the thickness of the side wall (105).

The side wall (105) configured as above-described allows the image sensor (5) at the second image sensor position (12b) to be disposed at a location of lesser distance from the internal side wall surface (100) and the external surface of the side wall (105) as compared to other embodiments of the configuration shown in FIGS. 10 and 11. Understandably, the internal surface (100) sidewall (105) can be configured to provide the least or lesser distance between the sensor element (22) of the image sensor (5) and the external surface (36) of the side wall (105). Location of the image sensor (5) at a lesser distance from the internal surface (100) of the side wall (105) (or lesser distance from the external surface (36) of the side wall (105) correspondingly allows the sensed area (25) of the upper transparent window (9) to be located closer to the external surface of the side wall (105). Accordingly, the sensed area (25) of the upper transparent window (9) can be positionally fixed at a lesser distance from an object (107) when engaged with the external surface of the image scanner (1). As a result, even when an article (11) in relation to an object (107) on which the image scanning system (1) cannot be positionally fixed affords a relatively small margin (106), such embodiments of the image scanning system (1) can be forcibly urged against the object (107) to locate the scanned area (25) of the upper transparent window (9) a lesser distance from the object (107) to obtain a scanned image (44) of the article (11) which can include the entirety of the scannable area (40) of the article (11) or a greater portion of the scannable area (40) of the article (11). For example, comparing the configuration of the embodiment of FIG. 11 and the configuration of the embodiment of FIG. 12, the distance at which the sensed area (25) of the upper transparent window (9) can located relative to the external surface of the side wall (105) of the image scanning system (1) can be substantially less for the embodiment shown in FIG. 12 as compared to the embodiment of FIG. 11.

Again referring primarily to FIG. 12, embodiments of the invention which have a configuration of the side wall (105) which locate the image sensor (5) proximate the internal surface (100) of the side wall (105) may preclude or makes less practical formation of the loop (101) and electrical coupling of the second end (99) of the conductive ribbon (96) from the first image sensor side (102) which faces the internal surface (100). The conductive ribbon (96) can be alternately configured to electrically couple the second end (99) to image sensor (5) from the second image sensor side (113) facing away from the internal surface (100) of the side wall (105). The first end (97) electrically coupled to a power source (98) and internal computer (58).

As to these embodiments of the invention, the conductive ribbon (96) between the first end (97) and the occurrence of a fold element (114) can have one side disposed against the internal surface (100) of the lower housing (3). The fold element (114) can have a substantially fixed configuration formed in the substrate material on which the conductive element is disposed. As to those substrates which comprise a plastic layer or film the fold element (114) can be generated by application of heat to the substrate sufficient to allow the fold to be generated and then allowing the plastic to cool or cure. The second end (99) of the conductive ribbon (96) can be electrically coupled to the image sensor (5) from the second image sensor side (113) as shown in FIG. 10. The fold element (114) functions to provide a first portion (103) of the conductive ribbon (96) which can be disposed in a folded back condition (115) in which the first portion (103) of the conductive ribbon (96) releasably engages the second portion (104) of the conductive ribbon (96). As the image sensor (5) travels from the first image sensor position (12a) toward the second image sensor position (12b), the first portion (103) of the conductive ribbon (96) pays out (as shown in FIG. 10) from the folded back condition (115). As the image sensor (5) travels from the second image sensor position (12b) toward the first images sensor position (12a) the first portion (103) of the conductive ribbon (96) returns to the folded back condition (115) in which the first portion (103) has layered engagement with the second portion (104) of the conductive ribbon (96). This configuration of the conductive ribbon (96) obviates use of the loop element (101) and electrical coupling of the second end (99) of the conductive ribbon (96) from the first image sensor side (102) as shown in FIGS. 10 and 11. While the embodiment of the invention shown in FIG. 12 shows that the second portion (104) of the conductive ribbon (96) has a surface that lies against the internal surface (100) of the lower housing (3); the invention is not so limited, and the conductive ribbon (96) having a fold element (114) can be operably located in the inside space (4) in any manner which allows the first portion (103) to pay out from and return to the fold back condition (115) as the image sensor (5) travels between first images sensor position (12a) and the second image sensor position (12b).

As can be easily understood from the foregoing, the basic concepts of the present invention may be embodied in a variety of ways. The invention involves numerous and varied embodiments of an image scanning system (1).

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of "a scanner" should be understood to encompass disclosure of the act of "scanning"—whether explicitly discussed or not—and, conversely, were there effectively disclosure of the act of "scanning", such a disclosure should be understood to encompass disclosure of "a scanner" and even a "means for scanning." Such alternative terms for each element or step are to be understood to be explicitly included in the description.

In addition, as to each term used it should be understood that unless its utilization in this application is inconsistent with such interpretation, common dictionary definitions should be understood to included in the description for each term as contained in the Random House Webster's Unabridged Dictionary, second edition, each definition hereby incorporated by reference.

For the purposes of the present invention, ranges may be expressed herein as from "about" one particular value to "about" another particular value. When such a range is expressed, another embodiment includes from the one particular value to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. Unless otherwise expressly described embodiments of the invention occur within the range in increments of five percent. In the absence of any express written value, "about" means within +/−10 percent of the numerical value indicated.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) the image scanning systems herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

We claim:

1. An optical scanner, comprising:
    an upper housing having an upper transparent window;
    a lower housing which matingly engages said upper housing to define a hollow inside space, said upper housing and said lower housing in mated engagement provide a side wall having a thickness disposed between a pair of generally flat surfaces having substantially perpendicular fixed relation to a substantially planer external face of said upper housing and said lower housing, wherein said lower housing has a lower transparent window, and said upper transparent window is viewable through said lower transparent window;
    a light filter coupled to the external surface of said lower transparent window which transmits light incident in substantially perpendicular relation to said lower transparent window, and wherein said light filter blocks light upon said lower transparent window incident at an angle of between about thirty five degrees and fifty five degrees; and
    an image sensor and image sensor driver operably located within said hollow inside space, said image sensor driven between a first image sensor position and a second image sensor position, said second image sensor position locating said image sensor in substantially abutted adjacent relation to an internal surface of said side wall which acts to reduce distance between the external surface of said side wall and the border of a scanned area of said upper transparent window.

2. The optical scanner of claim 1, further comprising a flexible electrically conductive ribbon having length disposed between a first end electrically coupled to a power source and an internal computer and a second end connected to a said image sensor, said flexible electrically conductive ribbon having a configuration which allows said image sensor to travel between a first image sensor position and said second image sensor position in substantially abutted adjacent relation to said internal surface of said side wall, said configuration of said flexible electrically conductive ribbon including a fold element which occurs at a location between said first end and said second end to define a first portion and a second portion of said flexible electrically conductive ribbon, said fold element disposes said first portion of said flexible electrically conductive ribbon in a folded back condition in relation to said second portion in the first image sensor position, said first portion of said flexible electrically conductive ribbon pays out from the folded back condition as said image sensor travels toward said second image sensor position.

3. The optical scanner of claim 2, further comprising viewable indicator marks disposed in said lower transparent window which indicate said border of said scanned area of said upper transparent window.

4. The optical scanner of claim 3, further comprising viewable overlap indicators disposed in said lower transparent window which indicate overlap between a plurality of scanning cycles to allow stitched assembly of a corresponding plurality of images into one image.

5. The optical scanner of claim 4, wherein said viewable overlap indicators provide sufficient horizontal overlap of said scanned area between said scanning cycles to allow stitched horizontal assembly of said corresponding plurality of images into one image.

6. The optical scanner of claim 5, wherein said viewable overlap indicators provide sufficient vertical overlap of said scanned area between said scanning cycles to allow stitched vertical assembly of said corresponding plurality of images into one image.

7. The optical scanner of claim 1, further comprising a linear edge guide element along at least one side of said upper housing and said lower housing in mated engagement adapted for sliding engagement with a generally linear guiding surface to reduce or avoid rotation of said scanned area of said upper transparent window between said plurality of scanning cycles.

8. The optical scanner of claim 1, wherein said side wall of said upper housing and said lower housing in mated engagement has a thickness of between about one-eighth inch and about one-half inch.

9. The optical scanner of claim 8, wherein said upper transparent window and said lower transparent window engage about one half said thickness of said sidewall.

10. The optical scanner of claim 9, wherein said upper housing and said lower housing comprise a one-piece housing.

11. A method of producing an optical scanner, comprising the steps of:
    providing an upper housing having an upper transparent window;
    providing a lower housing which matingly engages said upper housing to define a hollow inside space, said upper housing and said lower housing in mated engagement provide a side wall having a thickness disposed between a pair of generally flat surfaces having substantially perpendicular fixed relation to each substantially planer external face of said upper housing and said lower housing;
    establishing a lower transparent window in said lower housing, wherein said upper transparent window is viewable through said lower transparent window;
    coupling a light filter to the external surface of said lower transparent window which transmits light incident in substantially perpendicular relation to said lower transparent window, and wherein said light filter blocks light upon said lower transparent window incident at an angle of between about thirty five degrees and fifty five degrees; and
    operably locating an image sensor and image sensor driver within said hollow inside space, said image sensor driven between a first image sensor position and a second image sensor position, said second image sensor position locating said image sensor in substantially abutted adjacent relation to an internal surface of said side wall which acts to reduce distance between the external surface of said side wall and the border of a scanned area of said upper transparent window.

12. The method of producing the optical scanner of claim 11, further comprising the step of providing a flexible electrically conductive ribbon having length disposed between a first end electrically coupled to a power source and an internal computer and a second end connected to a said image sensor, said flexible electrically conductive ribbon having a configuration which allows said image sensor to travel between a first image sensor position and said second image sensor position in substantially abutted adjacent relation to said internal surface of said side wall, said configuration of said flexible electrically conductive ribbon including a fold element which occurs at a location between said first end and said second end to define a first portion and a second portion of said flexible electrically conductive ribbon, said fold element disposes said first portion of said flexible electrically conductive ribbon in a folded back condition in relation to said second portion in the first image sensor position, said first portion of said flexible electrically conductive ribbon pays out from the folded back condition as said image sensor travels toward said second image sensor position.

13. The method of producing the optical scanner of claim 12, further comprising the step of disposing viewable indicator marks in said lower transparent window which indicate said border of said scanned area of said upper transparent window.

14. The method of producing the optical scanner of claim 13, further comprising the step of disposing viewable overlap indicators in said lower transparent window which indicate overlap between a plurality of scanning cycles to allow stitched assembly of a corresponding plurality of images into one image.

15. The method of producing the optical scanner of claim 14, further comprising the step of disposing said viewable overlap indicators in said lower window to indicate sufficient horizontal overlap of said scanned area between said scanning cycles to allow stitched horizontal assembly of said corresponding plurality of images into one image.

16. The method of producing the optical scanner of claim 14, further comprising the step of disposing said viewable overlap indicators in said lower window to indicate sufficient vertical overlap of said scanned area between said scanning cycles to allow stitched vertical assembly of said corresponding plurality of images into one image.

17. The method of producing the optical scanner of claim 11, further comprising the step of providing a linear edge guide element along at least one side of said upper housing and said lower housing in mated engagement adapted for sliding engagement with a generally linear guiding surface to reduce or avoid rotation of said scanned area of said upper transparent window between said plurality of scanning cycles.

18. The method of producing the optical scanner of claim 11, further comprising the step of providing said side wall of said upper housing and said lower housing in mated engagement with a thickness of between about one-eighth inch and about one-half inch.

19. The method of producing the optical scanner of claim 18, wherein said upper transparent window and said lower transparent window engage about one half said thickness of said sidewall.

20. The method of producing the optical scanner of claim 19, further comprising the step of providing said upper housing and said lower housing as a one-piece housing.

* * * * *